June 10, 1941. G. WHEAT 2,245,099
STORAGE BATTERY FOR HEARING-AID APPARATUS
Filed May 19, 1938
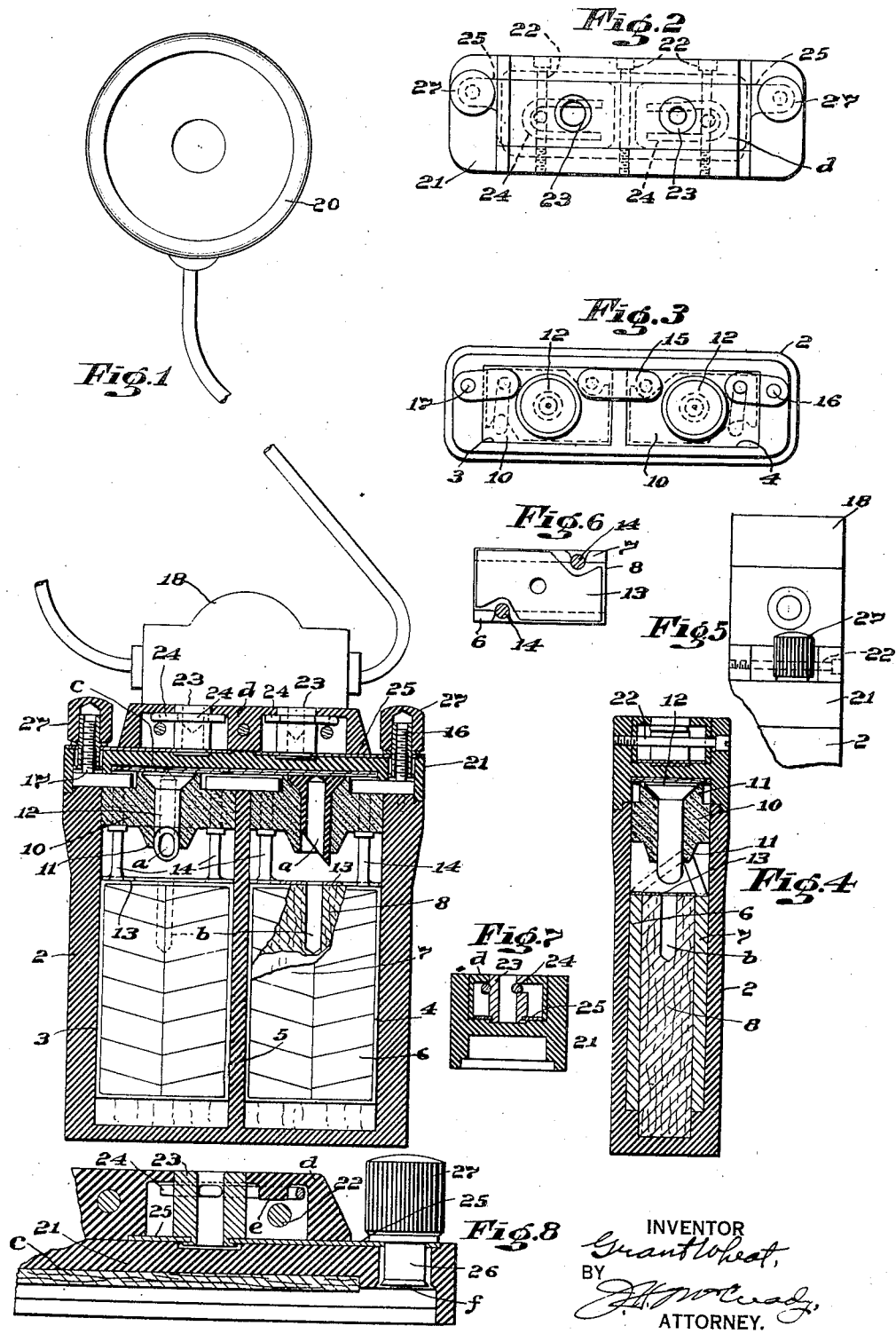

Patented June 10, 1941

2,245,099

UNITED STATES PATENT OFFICE 2,245,099

STORAGE BATTERY FOR HEARING-AID APPARATUS

Grant Wheat, Marlboro, Mass., assignor to Koehler Manufacturing Company, Marlboro, Mass., a corporation of Massachusetts Application May 19, 1938, Serial No. 208,801

1 Claim. (Cl. 136—170)

This invention relates to storage batteries, and more especially to batteries of this type designed for use with hearing-aid apparatus.

A battery devised especially for this purpose is shown and described in my pending application Ser. No. 42,477, filed September 27, 1935, now Patent 2,179,393 granted Nov. 7, 1939. This battery has proved very satisfactory in use and has been well received by the trade. The present invention aims further to improve and perfect batteries of this general type with a view to making them even more reliable and more convenient to use, and reducing the expense of manufacturing them.

The nature of the invention will be readily understood from the following description when read in connection with the accompanying drawing, and the novel features will be particularly pointed out in the appended claim.

In the drawing,

Figure 1 is a vertical, sectional view of a battery embodying features of this invention and showing it connected to parts of the hearing-aid equipment;

Fig. 2 is a plan view of the cover for the battery;

Fig. 3 is a plan view of the battery with the cover removed;

Fig. 4 is a vertical, transverse, sectional view of the battery;

Fig. 5 is an end view of the upper part of the battery and amplifier unit shown in Fig. 1;

Fig. 6 is a plan view of the battery units in an individual cell;

Fig. 7 is a vertical, transverse, sectional view through the cover; and

Fig. 8 is a view at right angles to Fig. 7 on a larger scale.

The battery shown in the drawing comprises a jar 2 made of Bakelite, vulcanite, or any other suitable material having the necessary insulating properties and adapted to be molded into the desired form. It is relatively thin and flat and of such dimensions as to conveniently fit in a pocket in the clothing. The particular form shown is provided with two cells, and therefore is made with two chambers 3 and 4, respectively, separated by a partition 5. Each cell contains battery elements including positive and negative plates 6 and 7, respectively, Fig. 4, cooperating with an intervening separator 8. Preferably practically the entire body of electrolyte is held in an absorbed condition and for this, as well as for other reasons, the separator 8 preferably is made of balsa wood. So far as the features above described are concerned, the construction is essentially like that shown in my earlier application above referred to.

According to the present invention, the upper end of the chamber 3 is sealed by a closure or gasket 10 consisting of soft rubber, either natural or synthetic, molded to fit snugly into the top of the chamber and to fill the space therein tightly. It is held in place by its own resiliency. A filling tube 11 is made integral with this gasket and comprises portions projecting both above and below it. Normally this tube is closed by a plug 12 which also may be made of rubber or other moldable material and which fits snugly but removably in the tube. Preferably it has a relatively large tapered head fitting into the flared aperture at the upper end of the filling tube. A hole or bore $a$ in the plug provides a vent for the escape of gases created in the battery, but this hole is so reduced in diameter at its upper end that the vent at this point is of extremely restricted dimensions. Such an arrangement is of advantage in reducing very substantially the rate of evaporation of the electrolyte and thus making it necessary to add water only at very infrequent intervals. Usually the addition of a few drops of water to the battery when it is placed on charge is all the attention which it requires in this respect. At that time the plug 12 is removed and the water is introduced, preferably with a medicine dropper inserted through the filling tube with its lower end extending into the recess $b$ formed in the upper portion of the separator 8. The chamber 4 is similarly equipped and corresponding parts are designated by the same numerals.

In order to further retard the rate of evaporation of electrolyte from the battery, I prefer to place a relatively thin plate 13 made of rubber or other suitable insulating material upon the upper surface of the battery elements in each chamber where it covers practically the entire surface of these elements, as shown in Fig. 6. It is, however, cut away to accommodate the leads 14 which extend upwardly from the plates and through the gaskets 10. These leads are provided with shoulders to support the gasket. Immediately above the gasket the positive lead of one cell is connected to the negative of the other by a short bar 15, while the other two leads from the two cells are similarly connected to screw threaded terminal binding posts 16 and 17, respectively, all of these connections being fused. The two binding posts are embedded securely in the wall of the jar 2 at opposite ends thereof, as best shown in Fig. 1.

It is desirable in an apparatus of this type to mount an amplifier 18, Fig. 1, directly on the top of the battery, this amplifier being connected both to the transmitter (not shown) and also to the receiver 20. To facilitate this mounting as well as to meet certain requirements of the battery, the invention provides a novel cover structure for the battery jar. As best shown in Figs. 1, 2, 7 and 8, this cover comprises a body portion 21 designed to fit over the rabbeted upper edge of the jar and to close the entire upper end of the jar. It preferably is molded of some such material as that of which the jar 2 is made and it is provided on its lower surface with a recess c, Fig. 1, in which a fairly thick body of sheeted fibrous material, such as blotting paper, straw board, or the like, is held, where it bears upon the upper edge of the filling tube 11 and closes both this tube and the vent through the plugs 12. The nature of this material, however, is such that it is permeable to the passage of gases escaping from the battery.

The cover also is provided in its upper side with a longitudinal groove in which a top section in the form of a bar d is removably secured by screws 22, Fig. 2. The outer surfaces of this removable section are flush with those of the main body of the cover, and this bar is shaped to provide recesses or chambers in which spring socket terminals 23—23 are positioned, these terminals being designed to receive and grip the pin or plug contacts projecting from the lower side of the amplifier 18. As shown more especially in Figs. 2 and 8, each socket comprises a tubular metal member with which a U-shaped metal spring 24 is associated, the socket being cut away at one side to admit one leg of the spring, while the opposite leg bears against the outer surface of the tube. Thus the springs are held against the upper wall of the recess in which they are located and they are positioned horizontally partly by the tubes and partly by a stud e, Fig. 8, projecting downwardly from the section d. When one of the studs of the amplifier is forced into the tube, its lower end engages the leg of the spring extending nto the bore of the tube and snaps into the groove with which pins or plugs of this type are provided. The spring expands and contracts to permit such engagement with the stud of the amplifier. Thus these spring sockets serve to make both a good electrical and mechanical connection with the amplifier.

In order to provide similar connections to the battery terminals, the lower end of the metal tube 23 is riveted over the margins of a hole in a metal strip 25 through which the metal shank 26 of the nut 27 projects. This metal shank extends through the end portion of the cover 21, and forms part of an internally threaded bushing designed to be screwed on to the binding post 16. Its lower end is expanded so that it cannot be removed from the plate. Thus these elements are assembled with the removable section d of the cover and preferably form a permanent unit. Also, the nuts 27 cooperate with the terminal binding posts 16 and 17 to secure the cover removably in its operative position on the jar. Since the cover 21 and its removable section d ordinarily are secured rigidly together, they also are handled usually as a unit, and if desired, the amplifier 16 may be considered as a part of this unit since it is normally secured firmly to the cover.

The invention thus provides a battery which can be manufactured economically, in which any danger of spilling the electrolyte is substantially eliminated, which requires relatively little attention on the part of the user, in which the conducting parts are so disposed that accidental short-circuiting is extremely unlikely, and which is exceptionally reliable.

Having thus described my invention, what I desire to claim as new is:

In a storage battery of the character described, the combination of a battery jar having a chamber therein, storage battery elements in said chamber and terminals therefor, an insulating cover for said jar adapted to close the top of the jar, said cover including a bottom having a recess in its upper portion, a separate top section of insulating material fitting into said recess, said top section being provided with recesses for the reception of terminals for said battery and having openings in its upper surface, socket type terminals carried by said separate top section, each of said terminals including a tube open at the top and cut away at one side thereof, a U-shaped spring straddling said tube and having one leg positioned in said cut away portion thereof, said tubes being aligned with and extending through said openings, means for securing said top section to said cover, means electrically connecting said terminals with the terminals of said battery elements, the top and bottom cover sections cooperating to substantially enclose the socket terminals within the said recesses except for the portions extending through the openings.

GRANT WHEAT.